US012671507B2

(12) United States Patent
Rácz et al.

(10) Patent No.: US 12,671,507 B2
(45) Date of Patent: Jun. 30, 2026

(54) METHODS, APPARATUS AND MACHINE-READABLE MEDIA RELATING TO CHANNEL QUALITY PREDICTION IN A WIRELESS NETWORK

(71) Applicant: Telefonaktiebolaget LM Ericsson (publ), Stockholm (SE)

(72) Inventors: András Rácz, Budapest (HU); Tamas Borsos, Budapest (HU); András Veres, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 683 days.

(21) Appl. No.: 17/768,304

(22) PCT Filed: Oct. 21, 2019

(86) PCT No.: PCT/EP2019/078576
§ 371 (c)(1),
(2) Date: Apr. 12, 2022

(87) PCT Pub. No.: WO2021/078357
PCT Pub. Date: Apr. 29, 2021

(65) Prior Publication Data
US 2023/0155705 A1     May 18, 2023

(51) Int. Cl.
| | |
|---|---|
| *H04B 17/391* | (2015.01) |
| *H04B 17/373* | (2015.01) |
| *H04W 16/20* | (2009.01) |
| *H04W 16/22* | (2009.01) |

(52) U.S. Cl.
CPC ....... *H04B 17/3913* (2015.01); *H04B 17/373* (2015.01); *H04W 16/20* (2013.01); *H04W 16/225* (2013.01)

(58) Field of Classification Search
CPC . H04B 17/382; H04B 17/3913; H04B 17/373
See application file for complete search history.

(56) References Cited

U.S. PATENT DOCUMENTS

| | | | |
|---|---|---|---|
| 2005/0227697 A1 | 10/2005 | Borst et al. | |
| 2020/0053591 A1* | 2/2020 | Prasad | H04N 21/2402 |
| 2020/0219386 A1* | 7/2020 | El Assaad | H04L 41/149 |
| 2021/0368415 A1* | 11/2021 | Bellis | H04W 40/16 |

OTHER PUBLICATIONS

Candell, R. et al., "Wireless Interference Estimation Using Machine Learning in a Robotic Force-Seeking Scenario", IEEE 28th International Symposium on Industrial Electronics, Jun. 12, 2019, pp. 1334-1341.

* cited by examiner

*Primary Examiner* — Sulaiman Nooristany
(74) *Attorney, Agent, or Firm* — COATS & BENNETT, PLLC

(57) ABSTRACT

The disclosure provides a method for estimating channel quality in a wireless network. The method comprises: obtaining information relating to a channel quality for a first time period, as measured by a wireless node located in an environment comprising one or more machines having mechanical parts which are movable in a periodic pattern; and providing the information as an input to a predictive model, developed using a machine-learning algorithm, to obtain a predicted channel quality in the environment for a second, subsequent time period.

20 Claims, 6 Drawing Sheets

METHODS, APPARATUS AND MACHINE-READABLE MEDIA RELATING TO CHANNEL QUALITY PREDICTION IN A WIRELESS NETWORK

TECHNICAL FIELD

Embodiments of the disclosure relate to wireless communications, and particularly to methods, apparatus and machine-readable media for predicting channel quality in a wireless network.

BACKGROUND

In typical radio communication systems (and particularly in systems employing orthogonal frequency division multiplexing, such as 4G and 5G), a receiving device such as a wireless device (in downlink) or a radio access network node (in uplink) senses the radio channel and sends feedback on the channel quality to the transmitting device (e.g., a radio access network node in downlink, or a wireless device in uplink). For example, the receiving device may transmit a channel quality indicator (CQI) report comprising an indication of the quality of the channel. The transmitting device then adapts the transmission scheme (e.g., modulation and coding scheme) according to the feedback for a following transmission to the receiving device. For example, if the channel gain decreases or interference increases, the coding rate may be increased and/or the modulation depth may be decreased, so that the transmission is more robust to the poor radio conditions and more likely to be successfully received. This process is called link adaptation.

As noted above, one known feedback from a wireless device (or UE) to the radio access network node (e.g., a base station such as eNG, gNB, etc) is the CQI. In LTE, the CQI comprises a four-bit index taking one of 15 values, indicative of the channel quality as measured by the wireless device. The methods by which the CQI is determined in the wireless device have not been fixed in telecommunication standards, and are rather considered a matter for implementation by equipment manufacturers. However, it is widely assumed that the CQI is determined by the wireless device based on one or more of: a signal-to-noise ratio; a signal-to-interference-and-noise ratio; a signal-to-noise-and-distortion ratio; and/or any analogous quantities. These quantities may be measured by the wireless device based on known reference signals transmitted by the radio access network node, such as channel state information reference signals (CSI-RS). The reported CQI is used by the network to determine an appropriate modulation and coding scheme, for example by following a mapping set out in a communication standard such as 3GPP TS 36.213, v 15.7.0 (see Tables 7.2.3-1 to 7.2.3-6).

The efficiency of link adaptation depends critically on the accuracy with which the channel quality is measured. If the channel quality is underestimated, the link adaptation becomes too conservative and the channel is under-utilized. If the channel quality is overestimated, the link adaptation becomes too ambitious and retransmissions, delays and reduced throughput may result. In either case, the operation point of the wireless channel is non-optimal.

One challenge to the accurate measurement and reporting of channel quality is that the channel quality is known to change both rapidly. In this case, the delay introduced by the mechanism for feeding back channel quality (e.g., time to perform measurements, determine the CQI, formulate the CQI report, and transmit the CQI report to the transmitting device) means that the reported channel quality may be obsolete, or at least inaccurate, by the time the transmitting device receives and acts upon it.

US patent publication no 2005/0227697 attempts to solve this problem by providing a method in which the base station uses the reported channel quality data to predict the channel quality experienced by a mobile device at the actual time when a downlink transmission takes place. The prediction method in US 2005/0227697 uses a weighted average of previously reported channel quality values to predict the future value of channel quality. More recently, machine learning techniques have been applied to the problem of channel prediction, such as in a technical paper by Liao et al ("The Rayleigh Fading Channel Prediction via Deep Learning", Wireless Communications and Mobile Computing, July 2018, pages 1-11).

However, even with the application of powerful machine learning techniques, channel prediction remains a challenging problem. In particular, the large number of variables experienced by a wireless device at any one time (such as fast-changing multi-path components) mean that the channel quality can vary almost randomly from one time instance to the next.

An improved method of predicting the channel quality experienced by a wireless device is therefore required.

SUMMARY

According to a first aspect of the disclosure, there is provided a method for estimating channel quality in a wireless network. The method comprises: obtaining information relating to a channel quality for a first time period, as measured by a wireless node located in an environment comprising one or more machines having mechanical parts which are movable in a periodic pattern; and providing the information as an input to a predictive model, developed using a machine-learning algorithm, to obtain a predicted channel quality in the environment for a second, subsequent time period.

Apparatus and machine-readable media for performing the method outlined above may also be provided. For example, a second aspect of the disclosure provides a node for estimating channel quality in a wireless network. The node comprises processing circuitry and a non-transitory machine-readable medium storing instructions which, when executed by the processing circuitry, cause the node to: obtain information relating to a channel quality for a first time period, as measured by a wireless node located in an environment comprising one or more machines having mechanical parts which are movable in a periodic pattern; and provide the information as an input to a predictive model, developed using a machine-learning algorithm, to obtain a predicted channel quality in the environment for a second, subsequent time period.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
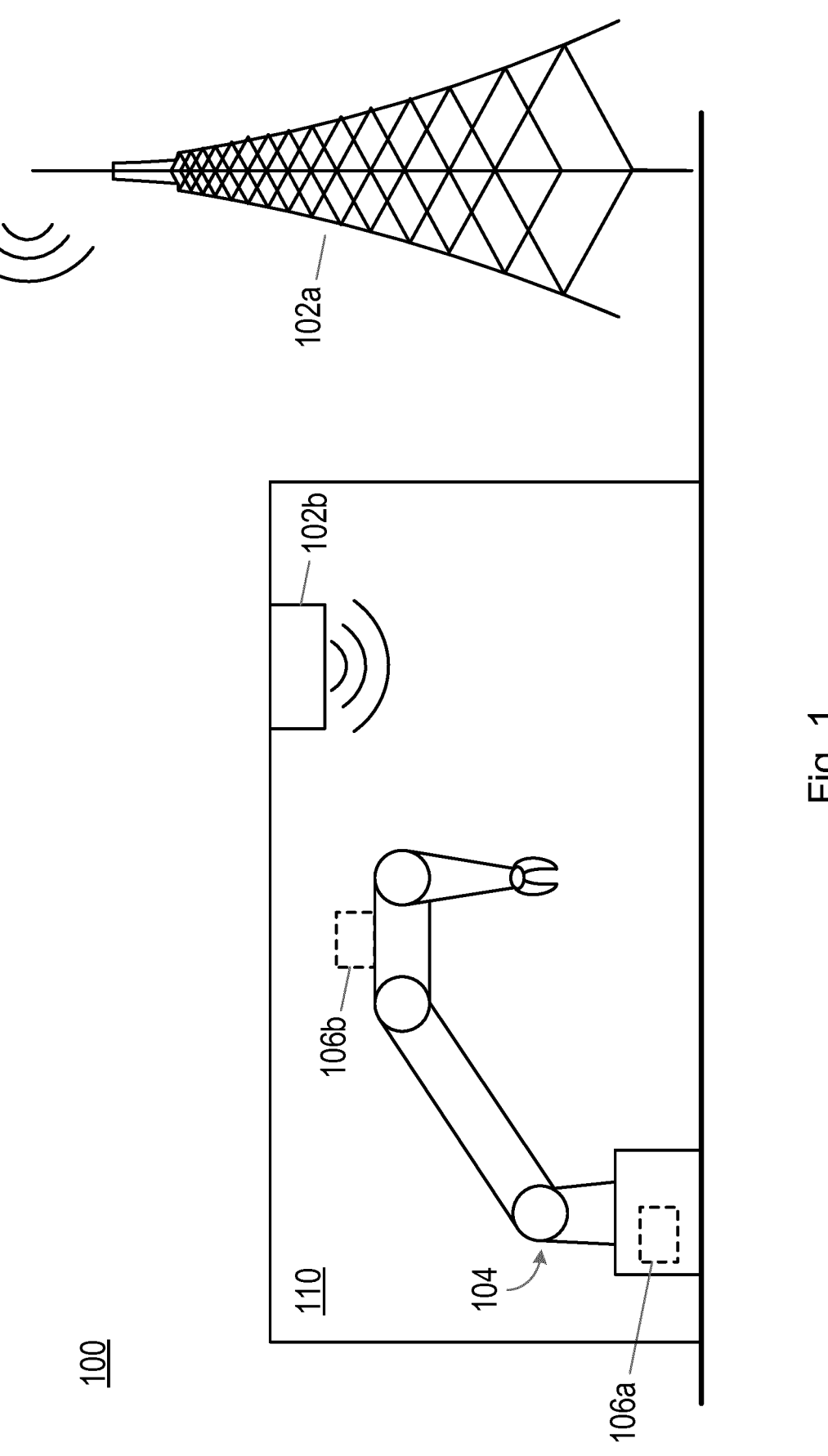
FIG. 1 is a schematic diagram of a wireless system according to embodiments of the disclosure.

FIG. 1 is a schematic diagram of a wireless system 100 according to embodiments of the disclosure.

The system 100 is defined, at least partly, with respect to an environment 110 in which one or more machines 104 having movable, mechanical parts are located. The environment 110 may be an industrial environment, such as a factory where goods are manufactured or assembled by those machines 104. The environment 110 may be enclosed, such that the machines 104 are located in an interior of a building (as in the illustrated embodiment), or open to the external environment.

The machines 104 are operable such that the mechanical parts thereof move in a periodic pattern. For example, the mechanical parts may perform the same, or substantially the same, set of motions in a cyclical manner. In one embodiment, where the environment 110 comprises a factory, the machines 104 may form part of one or more assembly lines configured to assemble or manufacture a product. Thus, each machine 104 performs the same motion periodically, so as to assemble or manufacture one or more products in each period. Examples of machines 104 include robots, automatic guided vehicles, manufacturing machines, assembling machines, transporting mechanisms, etc.

With the advent of the fifth generation of mobile communications (5G), attention is turning to the smart control of manufacturing plants or factories, such as the environment 110 shown in FIG. 1 and described above. For example, such environments may utilize wireless sensors to report environmental conditions such as temperature, humidity, sound levels, etc or performance parameters such as the location and/or acceleration of individual mechanical parts, the occurrence of faults, etc.

The control of such machines 104 may also be wireless. For example, control or instruction signals may be transmitted to the controllers for such machines 104, instructing them to perform one or more required tasks (possibly based on the data from the sensors). In the interests of safety, such control signals will typically require extremely low latency and high reliability, and indeed the Third Generation Partnership Project (3GPP) is working on mechanisms for delivering a class of traffic known as ultra-reliable low-latency communications (URLLC).

Thus, the system 100 further comprises one or more wireless devices 106 and one or more radio access network nodes 102. Control signals or instructions are transmitted wirelessly (e.g., via radio transmissions) from a radio access network node 102 to a wireless device 106, and then used to control or instruct a machine 104 connected to the wireless device 106 to perform one or more tasks.

The radio access network nodes 102 may be base stations, such as NodeBs, eNodeBs, gNodeBs, etc, transmission/reception points associated with such base stations, wireless access points, etc. FIG. 1 shows two possible locations for radio access network nodes: a first radio access network node 102a located external to the environment 110; and a second radio access network node 102b located internal to the environment 110. For example, the first radio access network node 102a may serve a macro cell, while the second radio access network node 102b may serve a small cell such as a micro- or pico-cell. In another example, the first radio access network node 102a may serve the general public, while the second radio access network node 102b may be dedicated to a network within the environment 110 (e.g., at the behest of the environment owner). It will be understood by those skilled in the art that only a single radio access network node is required for implementation of the concepts described herein. Unless otherwise stated, references herein to a radio access network node relate to radio access network nodes of either type 102a, 102b illustrated in FIG. 1. Collectively, the radio access network nodes are denoted with the reference numeral 102.

The wireless devices 106 are located within the interior of the environment 110. The wireless devices 106 may alternatively be termed user equipments (UEs), mobile stations (STAs), etc. Again, FIG. 1 shows two possible locations for the wireless devices: a first wireless device 106a which is coupled to a machine 104, but which is not located on a moving part thereof; and a second wireless device 106b which is coupled to a machine 104 and is located on a moving part thereof. The first wireless device 106a may be located in a base of the machine 104 as illustrated, or at some other location which is physically close enough to the machine 104 to enable control signals or instructions to be relayed from the first wireless device 106a to control circuitry of the machine 104 while meeting any latency requirements. It will be understood by those skilled in the art that only a single wireless device is required for implementation of the concepts described herein.

The system 100 may implement any suitable wireless communications protocol or technology, such as Global System for Mobile communication (GSM), Wide Code-Division Multiple Access (WCDMA), Long Term Evolution (LTE), New Radio (NR), WiFi, WiMAX, or Bluetooth wireless technologies. In one particular example, the system 100 implements part of a cellular telecommunication network, such as the type developed by the $3^{rd}$ Generation Partnership Project (3GPP). Thus in that example the radio access network node 102 comprises a base station such as a gNB or an eNB, and the wireless device 106 comprises a UE.

The radio transmissions between the radio access network node 102 and the wireless device 106 are subject to link adaptation as described above. Thus, for the transmission of downlink data (e.g., control signals or instructions), the wireless device 106 measures the radio channel quality and reports the channel quality to the radio access network node 102. The radio access network node 102 then adapts its subsequent transmissions so as to account for the reported channel quality. For example, the radio access network node 102 may select a modulation and coding scheme (MCS) based on the reported channel quality.

In industrial settings such as that of the environment 110, where the robustness and delays may be critical e.g., for robot control applications, the accurate prediction of channel quality becomes even more important.

Embodiments of the disclosure therefore provide methods, apparatus and machine-readable media in which information relating to a channel quality for a first time period, as measured by a wireless node located in an environment comprising one or more machines having mechanical parts which are movable in a periodic pattern, is provided as an input to a predictive model, developed using a machine-learning algorithm, to obtain a predicted channel quality in the environment for a second, subsequent time period. Owing to presence of periodic movement in the environment, the channel quality can also be expected to vary periodically. Thus more accurate channel quality prediction is possible than would otherwise be the case, using a predictive model developed using a machine-learning algorithm.

In further embodiments, the frequency (or period) of the periodic pattern (i.e., the movement of the mechanical parts) is also provided as an input to the predictive model, thus enabling the predictive model to more quickly and efficiently identify the periodic variation of the channel prediction as a consequence of the movement of the mechanical parts. The frequency may be provided by the machine itself or a controller thereof, or else may be determined by analysing the channel quality data itself. The frequency of the periodic pattern is expected to vary over a period of seconds or tenths of seconds. In contrast, the channel quality may vary over a period of milliseconds. Thus conventional models for predicting channel quality may be ill-suited to the detection of variation patterns as a consequence of the movement of mechanical parts. For example, in one embodiment, the frequency of the channel quality variation may be utilized by providing the predictive model with input data equal to the periodicity of the periodic pattern.

Figure 5:
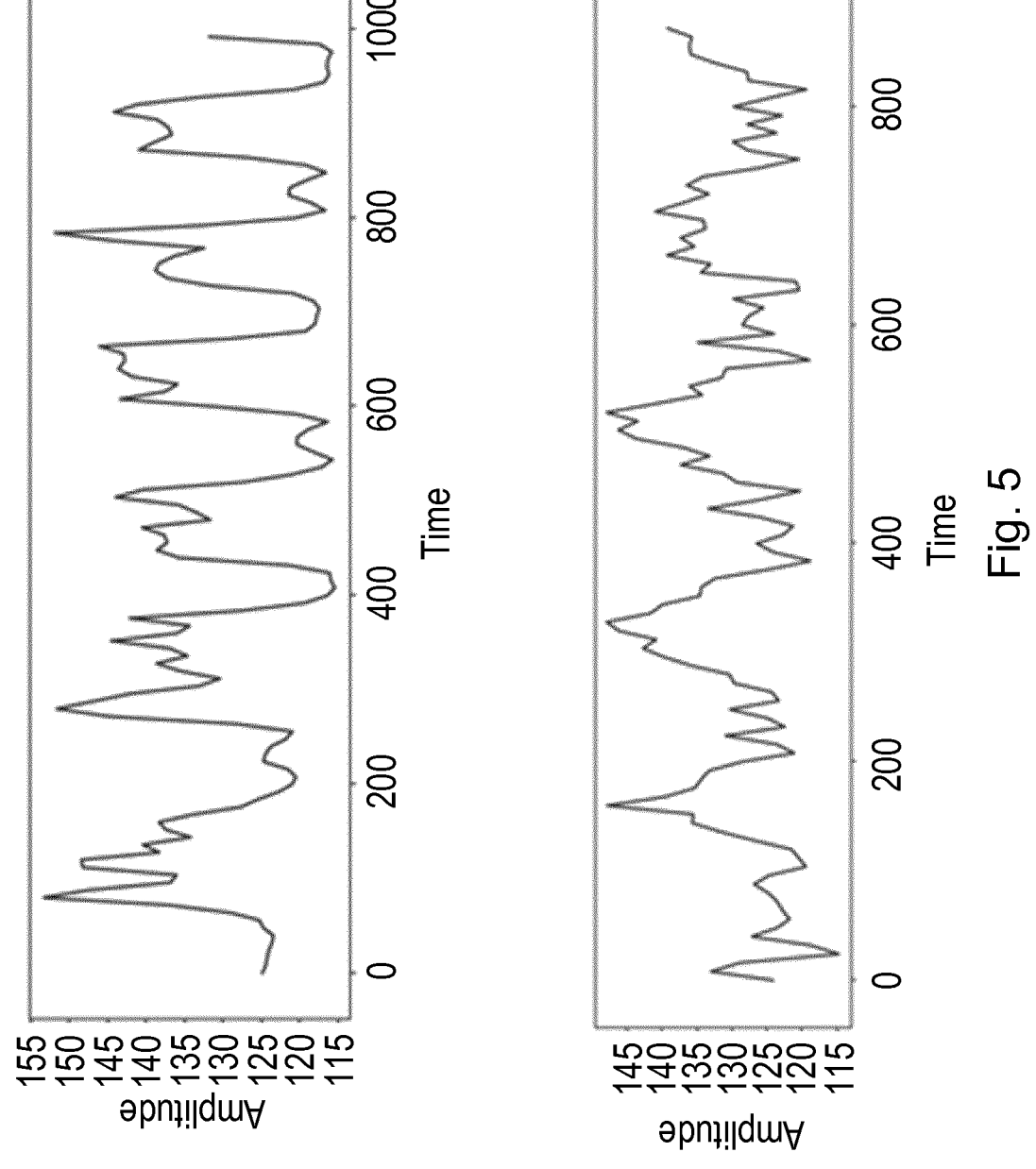
FIG. 5 shows two examples of channel fluctuations in an industrial environment.

For example, FIG. 5 shows two measured examples of the variation of channel quality. The upper trace shows measurements of channel quality performed by a wireless device that moves in a circular pattern; the lower trace shows measurements of channel quality performed by a wireless device moving back and forth horizontally. It can be seen that, on a shorter timescale, the channel quality varies rapidly in a manner which is difficult to predict. On a longer timescale, the channel quality varies in a periodic manner based on the periodic movement of the wireless device. Similar variations can be expected in the channel quality as measured by a wireless device which is not itself moving periodically, but which is located in an environment (such as environment 110 described above) where other objects are moving periodically.

Figure 2:
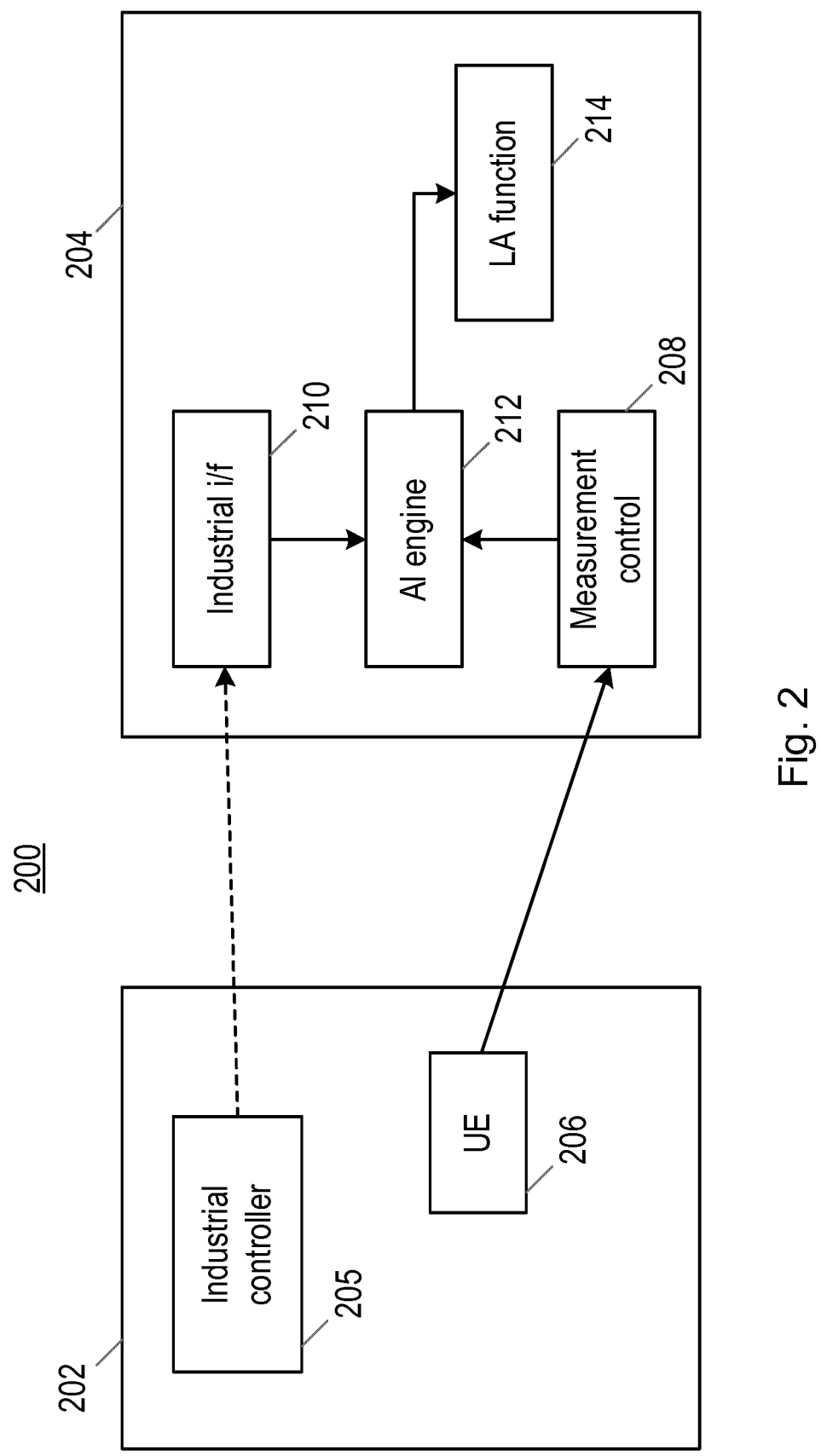
FIG. 2 is a schematic diagram of a wireless system according to further embodiments of the disclosure.

FIG. 2 is a schematic diagram of a wireless system 200 according to embodiments of the disclosure. The system 200 may be embodied in the system 100 described above with respect to FIG. 1. The system 200 comprises a machine 202 and a radio access network node 204. The machine 202 may correspond to the machine 104, while the radio access network node 204 may correspond to either radio access network node 102 shown in FIG. 1.

The machine 202 comprises a wireless device 206 (such as either wireless device 106 described above with respect to FIG. 1) and an industrial controller 205. The radio access network node 204 comprises a measurement control function 208, an industrial interface 210, an artificial intelligence (AI) engine 212 and a link adaptation function 214.

Embodiments of the disclosure relate to link adaptation for radio transmissions between the wireless device 206 and the radio access network node 204. As part of that process, the wireless device 206 performs measurements to assess the quality of the radio channel between the wireless device 206 and the radio access network node 204.

The measurements may be performed on one or more known reference signals or reference symbols transmitted by the radio access network node 204. Channel equalization is performed on these received reference signals or symbols, based on the known transmitted reference signals or symbols, to recover the radio channel between the wireless device 206 and the radio access network node 204. Information relating to the channel quality is then reported back by the wireless device 206 to the radio access network node 204. For example, the information may comprise a channel quality indicator (CQI), e.g., an index value within a particular range of values indicating the relative quality of the channel. As noted above, the CQI index in LTE is a four-bit index and can take one of 15 different values ranging from 1 (indicating very poor channel quality) to 15 (indicating very good channel quality); the 0 value is reserved to indicate that the wireless device is out of range of the radio access network node. This format may be re-used by the wireless device 206, or different formats may be used.

In further embodiments, the information relating to the channel quality may additionally or alternatively comprise the spectral response of the channel. Such a spectral response may comprise one or more of: the variation of channel gain with transmission frequency, over a range of transmission frequency; and the variation of channel phase shift with transmission frequency. The spectral response may be measured by the multi-path propagation between the radio access network node 204 and the wireless device 206.

The channel quality may be reported by the wireless device 206 when downlink traffic reception is ongoing, such that the modulation and coding scheme is adapted according to the changing channel conditions. Further, channel quality may be determined and reported by the wireless device 206 with resolution in the time and/or frequency domains as configured by the radio access network node 204. In extreme cases the channel quality reports may be sent every one or more milliseconds and/or for every Physical Resource Block (PRB) in the frequency domain.

The information relating to channel quality is received by the measurement control function 208 in the radio access network node 204 and propagated to the AI engine 212. The AI engine 212 comprises a predictive model for predicting a channel quality based on the information received by the measurement control function 208. That is, the information relating to channel quality received by the measurement control function 208 is measured by the wireless device 206 in a first time period; this information is provided to the predictive model, which outputs a predicted channel quality for a second, subsequent time period. The predicted channel quality may similarly comprise an index such as the CQI index, and/or a channel spectral response as described above.

This predicted channel quality is provided to the link adaptation function 214, which selects one or more transmission parameters for a transmission by the radio access network node 204 to the wireless device 206 in the second time period. The transmission parameters may comprise one or more of: a coding rate; a modulation depth or scheme; and a transmission power. For example, where the predicted channel quality is relatively low, the link adaptation function 214 may select one or more of: a relatively low coding rate, a relatively low modulation depth and a relatively high transmission power. Where the predicted channel quality is relatively high, the link adaptation function 214 may select one or more of: a relatively high coding rate, a relatively high modulation depth and a relatively low transmission power.

The industrial controller 205 of the machine 202 may optionally provide additional information relating to the periodic movement of the machine 202, which in turn is provided to the AI engine 212, and helps the learning and inference of the AI engine 212. Such information may be transmitted to the radio access network node 206 by the industrial controller 206 via the industrial interface 210, as illustrated. Such an industrial interface 210 may utilize a different mechanism than the radio interface provided by the wireless device 206, e.g., a wired interface, using an electronic and/or optical transmission medium. Alternatively, the machine 202 may transmit the additional information using the wireless device 206 and the radio interface between the machine 202 and the radio access network node 204.

The information provided by the industrial controller 205 may comprise one or more of: an indication of the frequency or period of the periodic operation or pattern of the moving mechanical parts of the machine 202; and an indication of the start time of each cycle in the periodic pattern of movement. This can help the AI engine 212 to learn the pattern in the channel response. In embodiments where the industrial controller 205 does not provide additional information relating to the periodic pattern of movement of the machine 202, the AI engine 212 or some other module within the radio access network node 204 may analyse the channel quality information reported by the wireless device 206 to determine a period of the periodic pattern of movement. For example, a Fourier analysis (such as a discrete Fourier transform) can be performed on the information, and the strongest frequency component of the Fourier transform used as the period of the periodic pattern.

The AI engine 212 may comprise or execute any machine-learning algorithm suitable for training the predictive model to predict channel quality. For example, the AI engine 212 may implement one or more of: long short term memory (LSTM); a deep neural network architecture; and generative models (including generative adversarial networks).

The predictive model may be trained to predict a channel quality based on reported time-series data for the channel quality. For example, the predictive model may be trained to receive, as input, n data samples of the channel quality arranged in time-series order (where n is an integer, and will typically be significantly higher than 1); and to output a prediction for the (n+k)th data value. k is an integer, and may be equal to 1 (e.g., where the predictive model outputs an immediately succeeding value for the channel quality) or a larger value (e.g., wherein the predictive model outputs a value for a time period which is further in the future). Where the period of the periodic pattern of movement of the mechanical parts is available, the number of data samples n may be selected so as to correspond to a single or a whole number of cycles of the periodic pattern.

The training of the predictive model can be automated, based on the complete data for the reported channel quality. That is, the predicted value for the (n+k)th data sample can be compared to the reported value of the (n+k)th data sample, and the comparison used to adjust the predictive model via the machine-learning algorithm. For example, the values of the weights of a neural network may be amended based on the feedback, so as to improve the predictive model and more accurately predict channel quality. Further, the training of the predictive model may take place in parallel with implementation of the predictive model to obtain the predicted channel quality.

In embodiments where the predictive model is implemented using a neural network architecture, the predictive model comprises a plurality of layers, with each layer comprising a plurality of weights. In some embodiments, one or more first (e.g., upper) layers of the architecture may be trained based on data provided by the wireless device 206 (i.e., the particular wireless device 206 for which the channel quality is being predicted). One or more second (e.g., lower) layers of the architecture may be trained based on data (e.g., reported channel quality) provided by a plurality of wireless devices in the same or a similar environment as the wireless device 206. In this way, the predictive model benefits from training based on a broad data set, and so may be able to predict channel quality in a wide range of scenarios; additionally, the predictive model benefits from training based on data provided by the specific wireless device for which it is to be implemented, and so may provide more accurate predictions of channel quality for that wireless device.

Although the AI engine 212 and its predictive model are implemented in the network node 204, those skilled in the art will appreciate that the training of the model may take place in a different node. For example, the radio access network node 204 may provide the reported channel quality data to a different network node entirely, where it can be used to train the predictive model as described above. Once trained, the predictive model can be provided to the node 204 to be implemented.

In the embodiment shown in FIG. 2, the predictive model (e.g., AI engine 212) is implemented in the network node 204. The network node 204 receives a report comprising an indication of channel quality from the wireless device 206, and then uses that reported channel quality to predict a future channel quality.

In other embodiments, the predictive model may be implemented in the machine 202 or the wireless device 206 itself. In such a scenario, for example, the wireless device predicts a future channel quality, based on a measured channel quality, and reports an indication of the predicted channel quality to the network node (possibly in addition to an indication of the measured channel quality).

Figure 3:
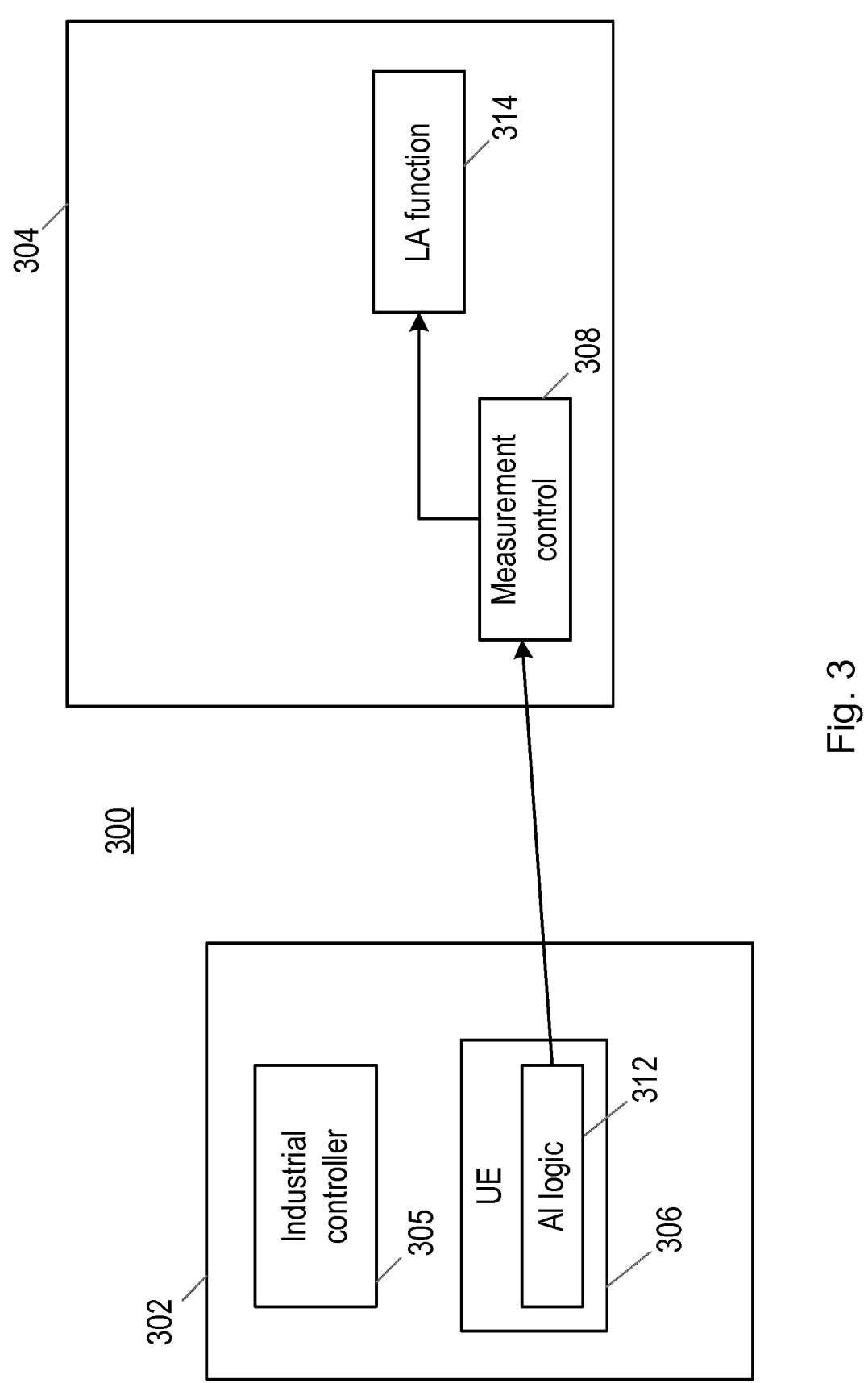
FIG. 3 is a schematic diagram of a wireless system according to yet further embodiments of the disclosure.

FIG. 3 is a schematic diagram of a wireless system 300 according to this alternative embodiment of the disclosure. Again, the system 300 may be embodied in the system 100 described above with respect to FIG. 1. The system 300 comprises a machine 302 and a radio access network node 304. The machine 302 may correspond to the machine 104, while the radio access network node 304 may correspond to either radio access network node 102 shown in FIG. 1.

The machine 302 comprises a wireless device 306 (such as either wireless device 106 described above with respect to FIG. 1) and an industrial controller 305. The radio access network node 304 comprises a measurement control function 308 and a link adaptation function 314. As noted above, the system 300 differs from the system 200 described above with respect to FIG. 2, in that the predictive model is implemented in the machine 302 rather than the network node 304. Thus, in the illustrated embodiment, the wireless device 306 comprises AI logic or engine 312; the AI engine 312 may alternatively be embodied elsewhere within or coupled to the machine 302.

Thus the wireless device 306 performs measurements to assess the quality of the radio channel between the wireless device 306 and the radio access network node 304, and to generate an indication of the channel quality. The indication of the channel quality may comprise a quantized value, such as a CQI index, and/or a spectral response of the channel. The channel quality is provided as an input to the AI engine 312, which implements a predictive model and outputs a predicted channel quality (such as a CQI index and/or channel spectral response) for a future time period.

An indication of the predicted channel quality is thus reported to the radio access network node 304. The radio access network node 304 receives the predicted channel quality value at the measurement control function 308, and provides it as an input to the LA function 314. Based on the predicted channel quality value, the LA function adapts one or more transmission parameters of an ensuing transmission to the wireless device 306 as described above. The wireless device 306 may additionally transmit an indication of one or more measured values of the channel quality, such that the measured values can be compared with the predicted values and used to train the predictive model (i.e., in the radio access network node 304 or another network node where training takes place).

The future time period may be predefined so as to match a time at which a transmission is expected to be made by the radio access network node. For example, the future time period may be predefined as an offset k from the most recent sample of measured channel quality data. In this embodiment, k may be defined to correspond to an amount of time required to prepare and transmit a channel quality report to the radio access network node 304, for the radio access network node 304 to adapt one or more transmission parameters based on the predicted channel quality, and for the radio access network node 304 to transmit a message to the wireless device 306.

Aside from these differences, the functioning of the system 300 is substantially similar to that of the system 200 described above. Although the AI engine 312 and its predictive model are implemented in the machine 302 (and particularly in the wireless device 306), those skilled in the art will appreciate that the training of the model may take place in a different node. For example, the radio access network node 304 (or another node entirely) may obtain the reported channel quality data and use it to train the predictive model. Once trained, the predictive model can be provided to the machine 302 to be implemented.

Of course, the training of the model may also take place in the machine 302 (e.g., the wireless device 306). In one particular embodiment, the predictive model is implemented using a neural network architecture, and comprises a plurality of layers, with each layer comprising a plurality of weights. One or more first (e.g., upper) layers of the architecture may be trained based on data provided by the wireless device 306, while one or more second (e.g., lower) layers of the architecture may be trained based on data (e.g., reported channel quality) provided by a plurality of wireless devices in the same or a similar environment as the wireless device 306. In this embodiment, the wireless device may receive the second layers of the model from the radio access network node 304 (or another node), and then train the first layers of the model itself.

Those skilled in the art will appreciate that FIGS. 2 and 3 show only those components necessary to an understanding of embodiments of the disclosure, and may omit components which will typically be found in the machines 202, 302 and the radio access network nodes 204, 304. For example, the radio access network node 204, 304 will typically comprise software and hardware for transmitting and receiving radio signals, including one or more antennas, oscillators, baseband processing circuitry, etc. Such components are not shown in FIGS. 2 and 3.

Figure 4:
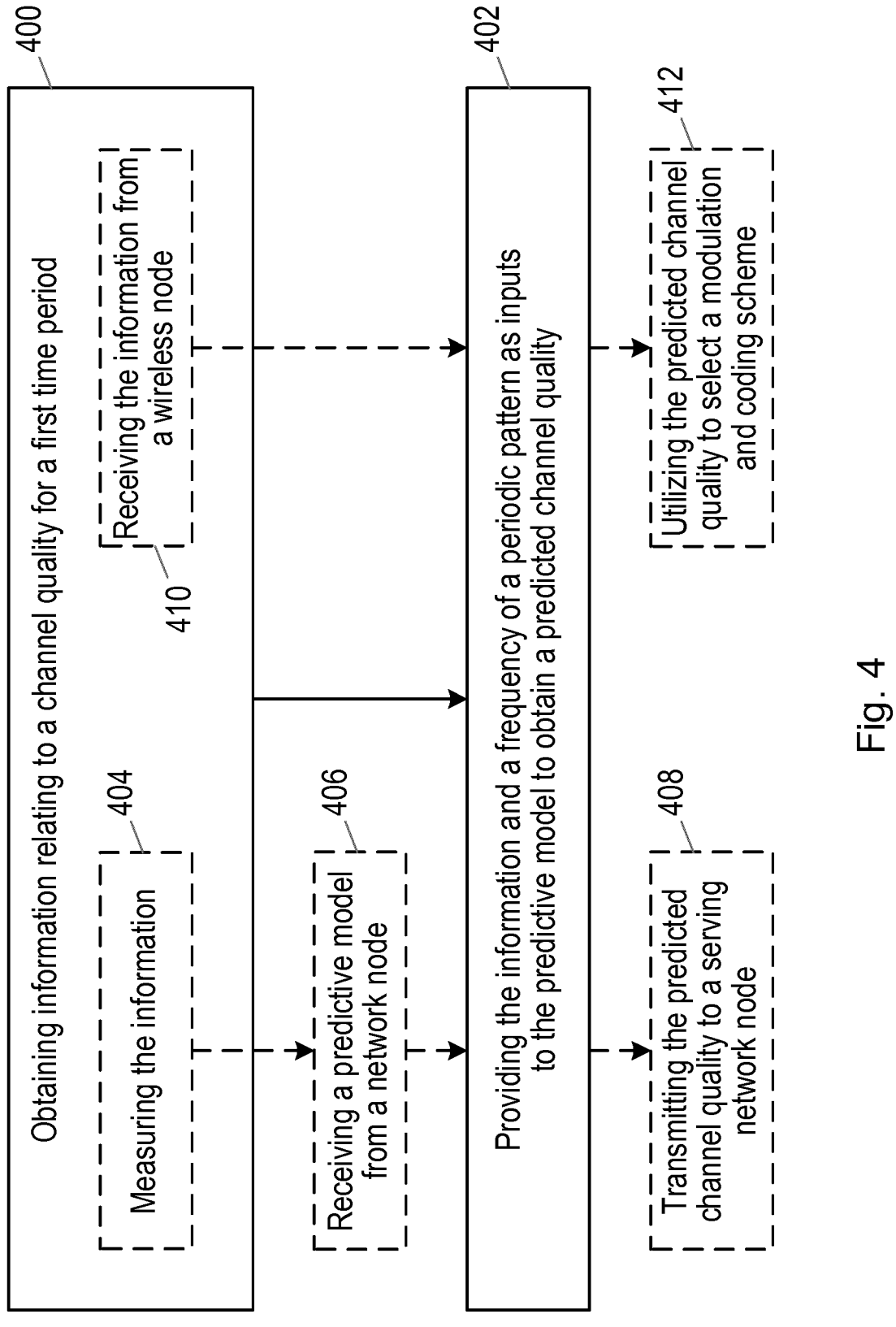
FIG. 4 is a flowchart of a method according to embodiments of the disclosure.

FIG. 4 is a flowchart of a method according to embodiments of the disclosure. The method may be performed by a node such as a wireless device (e.g., the wireless device 306 described above) or a network node (e.g., the radio access network node 204 described above, or another network node connected to such a radio access network node 204). The left-hand side of FIG. 4 shows steps which are specific to the former embodiment (where the method is performed by a wireless device); the right-hand side shows steps which are specific to the latter embodiment (where the method is performed by a network node).

In step 400, the node obtains information relating to a channel quality for a first time period, as measured by a wireless node located in an environment (such as the environment 110 described above) comprising one or more machines having mechanical parts which are movable in a periodic pattern. Where the method is performed by a wireless device, step 400 may comprise the sub-step 404 of performing measurements to obtain the information; where the method is performed by a network node, step 400 may comprise the sub-step 410 of receiving the information from the wireless node.

Thus a wireless node performs measurements to assess the quality of the radio channel between the wireless node and a radio access network node. The measurements may be performed on one or more known reference signals or reference symbols transmitted by the radio access network node. Channel equalization is performed on these received reference signals or symbols, based on the known transmitted reference signals or symbols, to recover the radio channel between the wireless node and the radio access network node.

For example, the information may comprise a channel quality indicator (CQI), e.g., an index value within a particular range of values indicating the relative quality of the channel. As noted above, the CQI index in LTE is a four-bit index and can take one of 15 different values ranging from 1 (indicating very poor channel quality) to 15 (indicating very good channel quality); the 0 value is reserved to indicate that the wireless device is out of range of the radio access network node. This format may be re-used by the wireless node, or different formats may be used.

In further embodiments, the information relating to the channel quality may additionally or alternatively comprise the spectral response of the channel. Such a spectral response may comprise one or more of: the variation of channel gain with transmission frequency, over a range of transmission frequency; and the variation of channel phase shift with transmission frequency. The spectral response may be measured by the multi-path propagation between the radio access network node and the wireless node.

Further, channel quality may be determined by the wireless node with resolution in the time and/or frequency domains as configured by the radio access network node. In extreme cases channel quality reports may be sent every one or more milliseconds and/or for every Physical Resource Block (PRB) in the frequency domain.

In step 402, the information is provided as an input to a predictive model, developed using a machine-learning algorithm, to obtain a predicted channel quality in the environment for a second time period which is subsequent to the first time period.

Optionally, additional information relating to the periodic pattern, such as the frequency of the periodic pattern (or equivalent quantities such as the period) and/or a start time of each cycle of the periodic pattern, may also be provided as an input to the predictive model. Such additional information may be provided to the node (e.g., by the machines or an industrial controller thereof), or known to the node (e.g., where the node is a wireless device connected to the machines or an industrial controller thereof). In further embodiments, the frequency of the periodic pattern may be determined by Fourier analysis of the reported channel quality.

The predicted channel quality may similarly comprise a quantized indication of the channel quality (e.g., an index such as the CQI index), and/or a channel spectral response as described above.

The machine-learning algorithm may be any machine-learning algorithm suitable for training the predictive model to predict channel quality, such as one or more of: long short term memory (LSTM); a deep neural network architecture; and generative models (including generative adversarial networks). Further detail regarding the training of the predictive model is set out above. The predictive model may be trained in any suitable node, such as the node performing the method or a different node. In the latter case (and particularly where the method is performed by a wireless device), the method may additionally comprise a preceding step 406 of receiving the predictive model from a network node.

Where the method is performed by a wireless device, the method further comprises a step 408 of transmitting an indication of the predicted channel quality to a network node, such as the serving network node for the wireless device. The network node is then enabled, based on the predicted channel quality value, to adapt one or more transmission parameters of an ensuing transmission to the wireless device in the second time period as described above. The transmission parameters may comprise one or more of: a coding rate; a modulation depth or scheme; and a transmission power.

Where the method is performed by a network node (such as the serving radio access network node), the predicted channel quality is used directly to select one or more transmission parameters for an ensuing transmission to the wireless device in the second time period.

Once the predictive model is performing adequately (e.g., meeting one or more performance criteria, such as an error rate which is below a threshold), the wireless device or node may be configured to report measured values of the channel quality at a lower rate or to stop reporting measured values of the channel quality altogether. For example, the wireless device may itself determine that the predicted channel quality matches the measured channel quality adequately and autonomously lower the frequency with which channel quality measurements are performed and/or channel quality reports are transmitted, or stop measuring and/or reporting channel quality altogether. Alternatively, the network node may determine that the predicted channel quality matches the measured channel quality adequately and configure the wireless device to stop reporting the measured values of the channel quality, or to lower the frequency with which it does so.

Figure 6:
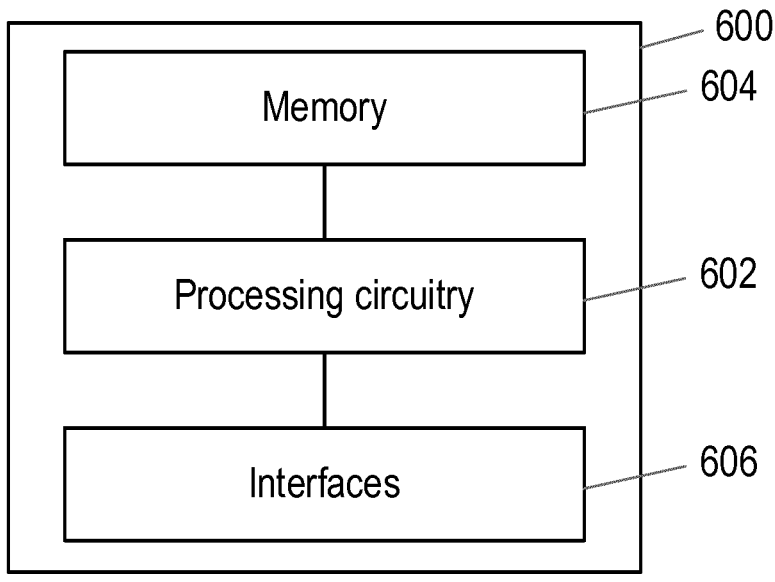
FIGS. 6 and 7 are schematic diagrams of a node according to embodiments of the disclosure.

FIG. 6 is a schematic diagram of a node 600 according to embodiments of the disclosure. The node 600 may be configured to perform any of the methods described above, including the method described with respect to FIG. 4. The node 600 may be, for example, a wireless device (such as the wireless device 106), a radio access network node (such as the base station 102), or a network node located in or coupled to a core network.

The node 600 comprises processing circuitry 602 (such as one or more processors, digital signal processors, general purpose processing units, etc), a machine-readable medium 604 (e.g., memory such as read-only memory (ROM), random-access memory, cache memory, flash memory devices, optical storage devices, etc) and one or more interfaces 606.

According to embodiments of the disclosure, the machine-readable medium 604 stores instructions which, when executed by the processing circuitry 602, cause the node 600 to: obtain information relating to a channel quality for a first time period, as measured by a wireless node located in an environment comprising one or more machines having mechanical parts which are movable in a periodic pattern; and provide the information as an input to a predictive model, developed using a machine-learning algorithm, to obtain a predicted channel quality in the environment for a second, subsequent time period.

The one or more interfaces 606 may comprise hardware and/or software suitable for communicating with other nodes of the wireless communication network using any suitable communication medium. For example, the interfaces 606 may comprise one or more wired interfaces, using optical or electrical transmission media. Such interfaces may therefore utilize optical or electrical transmitters and receivers, as well as the necessary software to encode and decode signals transmitted via the interface. In a further example, the interfaces 606 may comprise one or more wireless interfaces. Such interfaces may therefore utilize one or more antennas, baseband circuitry, etc.

In further embodiments of the disclosure, the node 600 may comprise power circuitry (not illustrated). The power circuitry may comprise, or be coupled to, power management circuitry and is configured to supply the components of node 600 with power for performing the functionality described herein. Power circuitry may receive power from a power source. The power source and/or power circuitry may be configured to provide power to the various components of node 600 in a form suitable for the respective components (e.g., at a voltage and current level needed for each respective component). The power source may either be included in, or external to, the power circuitry and/or the node 600. For example, the node 600 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Although FIG. 6 shows the processing circuitry 602, the memory 604 and the interface(s) 606 coupled together in series, those skilled in the art will appreciate that the components of the node 600 may be coupled together in any suitable manner (e.g. via a bus or other internal connection).

Figure 7:
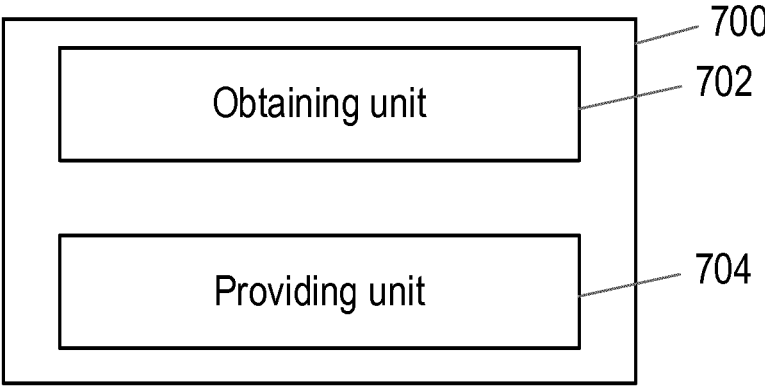

FIG. 7 is a schematic illustration of a node 700 according to further embodiments of the disclosure. The node 700 may be configured to perform any of the methods described above, including the method described with respect to FIG. 4. The node 700 may be, for example, a wireless device (such as the wireless device 106), a radio access network node (such as the base station 102), or a network node located in or coupled to a core network.

The node 700 comprises an obtaining unit 702 and a providing unit 704. The obtaining unit 702 is configured to obtain information relating to a channel quality for a first time period, as measured by a wireless node located in an environment comprising one or more machines having mechanical parts which are movable in a periodic pattern. The providing unit 704 is configured to provide the information as an input to a predictive model, developed using a machine-learning algorithm, to obtain a predicted channel quality in the environment for a second, subsequent time period.

The term "unit" may have conventional meaning in the field of electronics, electrical devices and/or electronic devices and may include, for example, electrical and/or electronic circuitry, devices, units, processors, memories, logic solid state and/or discrete devices, computer programs or instructions for carrying out respective tasks, procedures, computations, outputs, and/or displaying functions, and so on, as such as those that are described herein.

The present disclosure therefore provides methods, apparatus and machine-readable mediums for estimating or predicting a channel quality in a wireless network, and particularly in an environment comprising one or more machines having mechanical parts movable in a periodic pattern.

It should be noted that the above-mentioned embodiments illustrate rather than limit the concepts disclosed herein, and that those skilled in the art will be able to design many alternative embodiments without departing from the scope of the appended following statements. The word "comprising" does not exclude the presence of elements or steps other than those listed in a statement, "a" or "an" does not exclude a plurality, and a single processor or other unit may fulfil the functions of several units recited in the statements. Any reference signs in the statements shall not be construed so as to limit their scope.

The invention claimed is:

1. A method for estimating channel quality in a wireless network, the method comprising:

obtaining information relating to a channel quality for a first time period, as measured by a wireless node located in an environment comprising one or more machines having mechanical parts which are movable in a periodic pattern; and providing the information relating to the channel quality and information about the periodic pattern as an input to a predictive model, developed using a machine-learning algorithm, to obtain a predicted channel quality in the environment for a second, subsequent time period.

2. The method of claim 1, further comprising providing information relating to the periodic pattern as a second input to the predictive model.

3. The method of claim 2, wherein the information relating to the periodic pattern comprises: an indication of a frequency of the periodic pattern and/or an indication of a start time of each cycle of the periodic pattern.

4. The method of claim 2, wherein the obtaining the information relating to the periodic pattern comprises:

receiving an indication of the information relating to the periodic pattern directly or indirectly from the one or more machines or controllers thereof; or analyzing the information relating to the channel quality to determine the information relating to the periodic pattern.

5. The method of claim 2, wherein the information relating to the periodic pattern for the first time period has a length equal to a periodicity of the periodic pattern.

6. The method of claim 1, wherein the information relating to the channel quality for the first time period comprises a channel quality indicator index.

7. The method of claim 1, wherein the information relating to the channel quality for the first time period comprises a channel spectral response.

8. The method of claim 1:

wherein the predictive model comprises a first part learned from data measured by a plurality of wireless nodes located in the environment, and a second part learned from data measured by the wireless node;

wherein the first part comprises one or more first layers of a neural network; and wherein the second part comprises one or more second layers of the neural network, the second layers being higher than the first layers.

9. The method of claim 1, wherein the method is performed by the wireless node.

10. The method of claim 9, further comprising receiving the predictive model from a network node.

11. The method of claim 9, further comprising transmitting the predicted channel quality to a serving network node for the wireless node.

12. The method of claim 1, wherein the method is performed by a network node.

13. The method of claim 12, further comprising utilizing the predicted channel quality to select a modulation and coding scheme for transmissions to the wireless node.

14. The method of claim 1, wherein the wireless node is located on one of the machines having mechanical parts which are movable in a periodic pattern.

15. A node for estimating channel quality in a wireless network, the node comprising:

processing circuitry;

memory containing instructions executable by the processing circuitry whereby the node is operative to:

obtain information relating to a channel quality for a first time period, as measured by a wireless node located in an environment comprising one or more machines having mechanical parts which are movable in a periodic pattern; and provide the information relating to the channel quality and information about the periodic pattern as an input to a predictive model, developed using a machine-learning algorithm, to obtain a predicted channel quality in the environment for a second, subsequent time period.

16. The node of claim 15, wherein the instructions are such that the node is operative to provide information relating to the periodic pattern as a second input to the predictive model.

17. The node of claim 16, wherein the instructions are such that the node is operative to obtain the information relating to the periodic pattern by:

receiving an indication of the information relating to the periodic pattern directly or indirectly from the one or more machines or controllers thereof; or analyzing the information relating to the channel quality to determine the information relating to the periodic pattern.

18. The node of claim 16, wherein the information relating to the periodic pattern for the first time period has a length equal to a periodicity of the periodic pattern.

19. The node of claim 15:

wherein the predictive model comprises a first part learned from data measured by a plurality of wireless nodes located in the environment, and a second part learned from data measured by the wireless node;

wherein the first part comprises one or more first layers of a neural network; and wherein the second part comprises one or more second layers of the neural network, the second layers being higher than the first layers.

20. The node of claim 15, wherein the node is the wireless node.

* * * * *